United States Patent Office 3,317,587
Patented May 2, 1967

3,317,587
DIETHYL 4-BENZYL PIMELATE AND THE
REDUCTION OF KETO-ESTERS
Sheldon Chibnik, Plainfield, N.J., assignor to Mobil Oil
Corporation, a corporation of New York
No Drawing. Filed Oct. 15, 1963, Ser. No. 316,450
5 Claims. (Cl. 260—475)

This invention relates to various saturated esters prepared from certain keto-substituted carboxylic acid esters and is more particularly concerned with the preparation of such esters by catalytic hydrogenation of selected keto-esters, under special conditions.

While it is known that some keto esters may be reduced to saturated esters by various means, hydrogenation of the keto esters utilized herein results in cyclization to lactones rather than reduction to saturated esters. In my application Ser. No. 295,848, filed July 17, 1963, now U.S. Patent No. 3,278,557, I have described such a process for the formation of delta lactones from delta keto esters, without producing the saturated esters of the present invention.

The principal object of this invention is to provide a simple process for the catalytic hydrogenation of keto-substituted esters to produce saturated esters without substantial formation of the lactones. It is a further object to provide such a process which is characterized by sufficiently economical operations to permit commercial utilization. It is also an object of the invention to provide a high yield of product in low cost reaction units. It is still another object to carry out the process with sufficient speed to permit continuous operation thereof. Other objects and advantages of the invention, some of which are referred to more specifically hereinafter, will be apparent to those skilled in the art.

I have discovered that valuable saturated esters can be prepared by the catalytic hydrogenation of esters of gamma and delta keto-carboxylic acids in which the ketone function is in the alpha position with respect to an aromatic or unsaturated heterocyclic system. The hydrogenation is carried out in the presence of a strong acid, e.g., hydrochloric acid, and an alcohol or other suitable compound as a solvent. The reaction may be illustrated generically by the following equation:

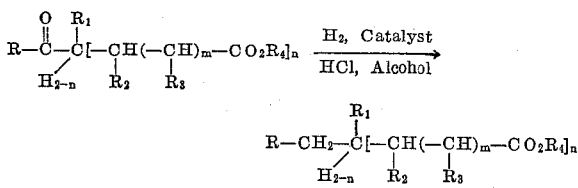

in which:

R=Aryl or unsaturated heterocyclic radical of aromatic character;
$R_1$=H, $CH_3$, $C_2H_5$
$R_2$=H, alkyl (1–8C);
$R_3$=H, $CH_3$, $C_2H_5$
$R_4$=Any alcohol group normally forming an ester;
$m$=1 or 2; and
$n$=1 or 2.

The type of apparatus used in the process is not critical. The reaction may be carried out as a batch process in a suitable autoclave provided with agitator means. If desired, suitable pressure tubing or the like may be used to permit sufficient time under proper conditions of temperature and pressure to operate the process continuously. In any case, the product solution is preferably filtered to remove the catalyst and the desired ester is obtained from the filtrate by distillation.

The following are more specific examples of the present process wherein and otherwise throughout the specification, parts and percentages are by weight:

Example 1

An autoclave provided with a stirrer was charged with a mixture of 320 parts (1.0 mol.) diethyl 4-benzoyl-pimelate, 6 parts 5% palladium on alumina, 6 parts concentrated hydrochloric acid and 1500 parts ethanol. While stirring the mixture at 46° C., hydrogen was introduced into the autoclave under an initial hydrogen pressure of 60.5 p.s.i In 1.75 hours, 2.0 moles of hydrogen had been absorbed in the reaction mixture which was then filtered to remove the catalyst. The filtrate so obtained was then distilled at 155–158° C. (0.35 mm.) and the diethyl 4-benzylpimelate hand an $n_D^{20}$ of 1.4913. Analysis of this ester gave C, 70.62% and H, 8.62% as compared with values calculated for $C_{18}H_{26}O_4$ of C, 70.56% and H, 8.55%. The infrared spectrum of this product showed no hydroxyl, lactone or ketone carboxyl groups.

As is shown in my application Ser. No. 295,848, if Example 1 is repeated without using the hydrohloric acid, only 1.0 mole of hydrogen absorbed after 21 hours of reaction time, and the product obtained is a lactone without production of saturated ester.

Similarly, other esters may be prepared using the procedures of Example 1 or modifications thereof such as are referred to herein, by substituting another suitable keto-ester for that used in the example. Typical keto esters including ethyl 4-benzoyl butyrate, methyl 4-benzoylvalerate, methyl 4-benzoyl-2 methyl valerate, dimethyl 2,6-dimethyl 4-benzoyl pimelate and the like, may be used to produce the corresponding benzyl compounds. Other keto esters which may be used include ethyl 4-(2-thenoyl) butyrate, methyl 4-(4-pyridinoyl)-2-methyl butyrate, and methyl 3-(1-naphthoyl) propionate. When the keto ester used in the present invention, contains an unsaturated heterocyclic radical instead of an aryl radical, such heterocyclic radical should be of aromatic character which will undergo hydrogenolysis from

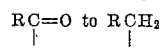

The typical heterocyclic radicals are those derived from pyridine, pyrrole, thiophene, furane, etc.

The various hydrogenation catalysts which may be used in the present process should not be affected by the acid used and comprise those which promote conversion of =C=O to =CHOH as is well known in the art. In place of the palladium, one may use other metals of the platinum and palladium series, copper chromite and other available metallic chromites, nickel (e.g., Raney nickel, nickel alloys), metals of groups 6 and 8 of the periodic tables (e.g., Cr, Mo, etc.), their acid insoluble compounds, with and without supporting carriers. The amounts of catalyst are not generally critical and may be varied widely.

With catalysts of the types mentioned, the reaction conditions may be varied to a considerable extent. For optimum control of the reaction and for most rapid results, a temperature range of about 45° C. to about 150° C. and hydrogen pressures of about 50 p.s.i. to about 1500 p.s.i are generally preferred but the process is not restricted thereto since faster or slower reaction rates may sometimes be indicated with corresponding changes in operating conditions. It should be noted, however, that the choices of catalyst and conditions of operation should be such as will avoid reduction of the aromatic ring system.

A catalytic amount of any strong mineral acid is required although concentrated hydrochloric acid is preferred because of its effectiveness and ready availability.

Sulfuric, phosporic and similar acids may be used. Although they may not be so reactive as hydrochloric acid and may require longer times of reaction. In place of the ethanol, other alcohols or other suitable solvents may be used so long as they do not adversely affect the hydrogenation reactions.

The esters produced according to the present invention are valuable commercial products which may be utilized as placticizers and/or solvents in various resin compositions. They may be used as chemical intermediates for the facile preparation of other compounds and, in some instances, may be used as monomers in the production of polymeric resins and the like.

Although the present invention has been described with preferred embodiments, it is to be understood that modifications and variations may be restored to, without departing from the spirit and scope of this invention, as those skilled in the art will readily understand. Such variations and modifications are considered to be within the purview and scope of the appended claims.

What is claimed is:

1. The process of preparing saturated esters from keto esters which comprises hydrogenating a solution of a compound having the formula:

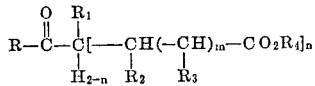

in which R is selected from the group consisting of aryl radicals and pyridyl, pyrryl, thienyl, and furyl radicals, $R_1$ and $R_3$ are selected from the group consisting of H, $CH_3$ and $C_2H_5$, $R_2$ is selected from the group consisting of H and an alkyl radical containing 1–8C atoms, $R_4$ is lower alkyl and $m$ and $n$ are selected from the group of integers consisting of 1 and 2, said hydrogenation being carried out with hydrogen in the presence of a hydrogenation catalyst and a strong mineral acid, at a temperature of between about 50° C. and about 150° C. and a pressure of between about 50 p.s.i and about 1500 p.s.i.

2. The process of claim 1 in which the strong acid is hydrochloric acid.

3. The process of claim 2 in which R is aryl.

4. The process of claim 2 in which the compound is diethyl 4-benzoyl pimelate.

5. Diethyl 4-benzyl pimelate.

References Cited by the Examiner
UNITED STATES PATENTS 3,071,612   1/1963   Nemec _____ 260—475

OTHER REFERENCES

Migrdichian, Organic Synthesis, vol. I, Reinhold, 1957, p. 183.

Wagner and Zook, Synthetic Organic Chemistry, Wiley, 1953, pp. 5–6, 432.

LORRAINE A. WEINBERGER, *Primary Examiner.*

KAREN I. ROSE, *Assistant Examiner.*